Nov. 21, 1950        H. G. PACK        2,530,907

THERMOELECTRIC GENERATOR

Filed April 5, 1948                                2 Sheets-Sheet 1

INVENTOR.
Herschel G. Pack
BY
Munn, Liddy & Glaccum
Attorneys

Nov. 21, 1950 H. G. PACK 2,530,907
THERMOELECTRIC GENERATOR
Filed April 5, 1948 2 Sheets-Sheet 2
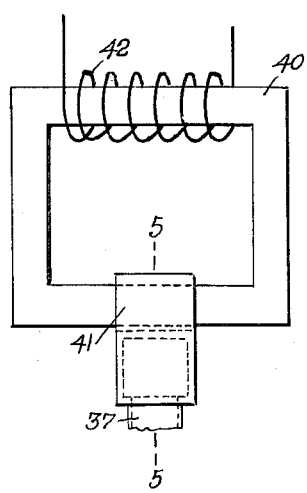
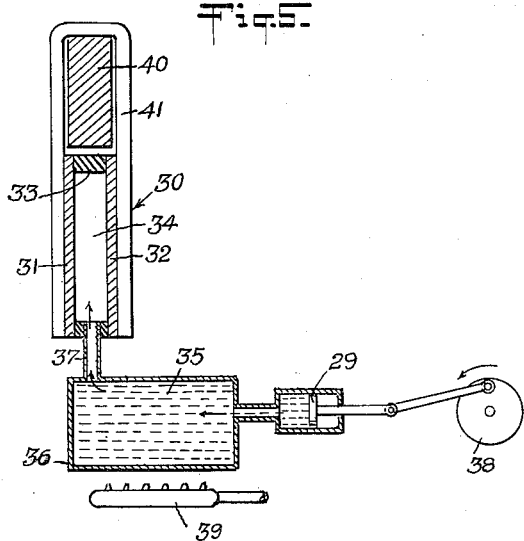
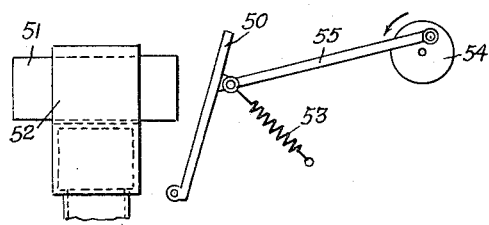
INVENTOR.
Herschel G. Pack
BY
Munn, Liddy & Glaccum
Attorneys Patented Nov. 21, 1950

2,530,907

UNITED STATES PATENT OFFICE 2,530,907

THERMOELECTRIC GENERATOR

Herschel G. Pack, Bakersfield, Calif.

Application April 5, 1948, Serial No. 18,877

6 Claims. (Cl. 171—97)

This invention relates to thermo-electric generators and more specifically to a device of this type that utilizes new and novel means for the generation of electrical energy. In my co-pending application, entitled "Thermo-Electric Generator," Serial No. 752,658, which was filed on June 5, 1947, I have described a thermo-electric generator utilizing movable heat transfer members positioned between the positive and negative elements for generating electrical energy. The primary difference between this invention and the reference invention is that I utilize liquid metal to replace the movable heat transfer elements shown therein. In the reference invention I explain how a third metal could be used between a positive and negative element to provide the heat required for thermo-electric generation in that the third metal was itself positive to one and negative to the other. I have found from experiments that molten metal acts exactly the same electrically and provides many advantages as a heat transfer element.

The principal objective of my invention was to construct a thermo-electric generator capable of continually generating a heavy electrical current and using an electrical conducting liquid for the efficient conduction of heat and for making an electrical connection between the positive and negative elements or plates of the thermocouples.

A further objective was to design such a generator which would have greater efficiency than heretofore obtained by similar devices.

In the preferred embodiment of my invention I provide a series of thermocouples with means for retaining an electrical conducting liquid between the elements of the thermocouples.

I further provide means for circulating hot and cold liquids in said electrical conducting liquid for the purpose of creating hot and cold junctions.

Further objectives and advantages of my invention will be apparent as I proceed with the description.

With reference to the drawings—

Fig. 4 shows a modification of my invention acting as a primary winding of a transformer;

Fig. 5 shows an enlarged sectional view on line 5—5 of Fig. 4; and

Fig. 6 shows a practical application of my invention.

Figure 1:
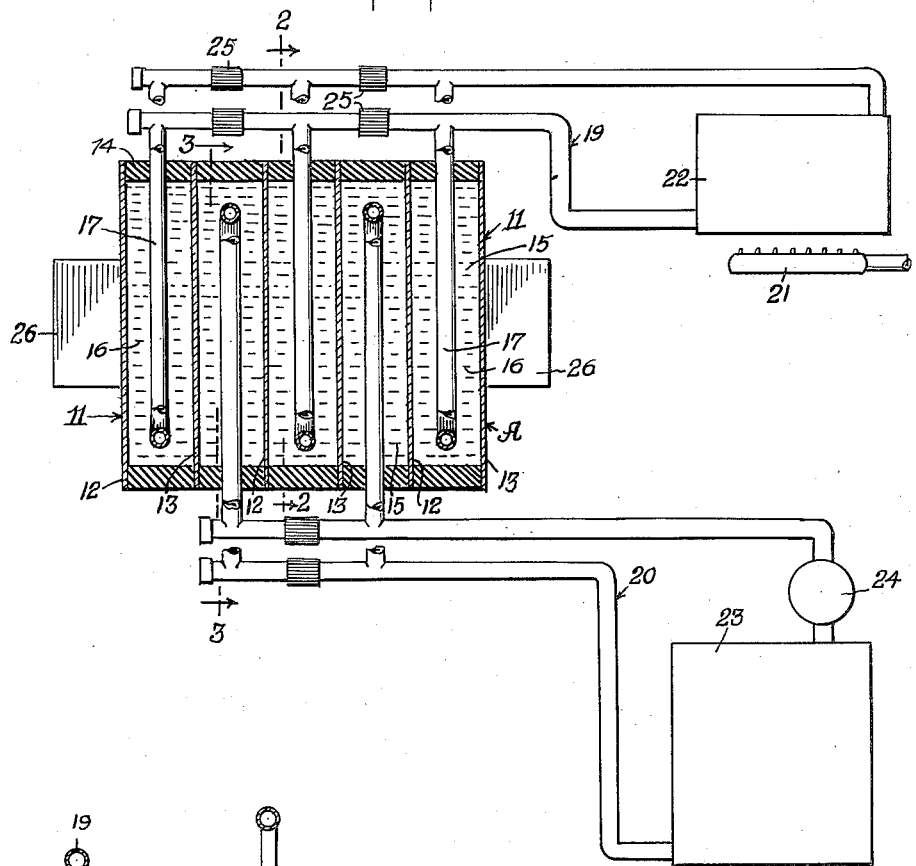
Fig. 1 shows an end elevation of the preferred form of my invention partially in section.
Figure 2:
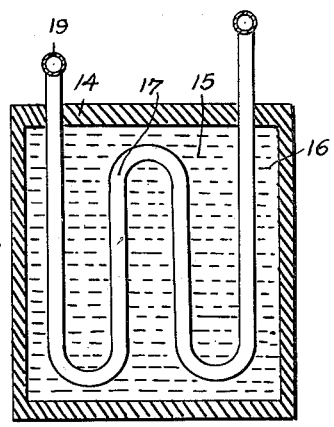
Fig. 2 shows a sectional view on line 2—2 of Fig. 1.
Figure 3:
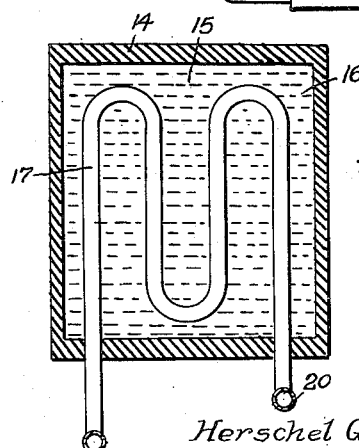
Fig. 3 shows a sectional view on line 3—3 of Fig. 1.

In Figs. 1, 2 and 3 I show the preferred form of my thermo-electric generator A which includes a plurality of thermocouples 11 in electrical series. Each thermocouple 11 consists of positive and negative elements 12 and 13 which are in the form of flat metal sheets. Any desired metals may be utilized so long as they are dissimilar thermo-electrically. The elements 12 and 13 are relatively thin having, however, a large cross-sectional area. The surface of the elements 12 and 13 are roughed or etched in order that a greater area might be exposed to the liquid medium. I have found that by having one element made of iron and the other of Monel very satisfactory results are obtained.

As shown in the drawings, the positive and negative plates 12 and 13 are spaced from each other and are maintained as a compact unit through apertured blocks 14 made of ceramic or other similar insulating material. It is imperative for the proper functioning of the generator A that these units be airtight and that the cavities or spaces 15 between the positive and negative elements be airtight in order to prevent oxidation of the plates and liquid medium. The cavities 15 between the plates 12 and 13 are preferably filled with sodium 16 which has a low melting point and is eminently satisfactory for this purpose, having excellent thermal conductivity properties in addition to its ability to make instantaneous electrical contact. In each cavity 15 is positioned a coil of tubing 17 with alternate cavities being connected to one system of tubing 19 and the other cavities being connected to another system of tubing 20. Through the first system of tubing 19 is circulated a heated medium which is maintained in a heated state by the burner 21 positioned below the reservoir 22. Through the other series of cavities is circulated a cooling medium which is pumped from a reservoir 23 and is circulated through the system 20 by the pump 24. The coil systems 19 and 20 through which the fluid will be circulated must also be airtight. In addition, rubber insulation 25 is provided to prevent short circuiting of the elements. It is also necessary that the fluids that are to be circulated in these tubes are reasonably good electrical insulators, and any one of a number of fluids that are known and used for heat transfer may be utilized.

With reference to the metal plates 12 and 13 it is important that the metal does not have too low a melting point. Since the electromotive force of a single thermocouple is low, it is necessary to connect a number of thermocouples in electrical series to attain a direct current of practical voltage and as many units as desired may be stacked together for this purpose. At the extreme ends of the generator A in contact with the terminal elements are heavy copper conductors 26 for the purpose of drawing off the electrical current that is generated. In operation, a heated fluid will be circulated through some of the tubes of the sodium-filled cavities while through alternate cavities a cooling fluid is circulated to absorb the heat conducted through the elements and the sodium barrier. This arrangement then provides the hot and cold junctions of a thermocouple which are necessary to generate the electricity. The sodium in the hot section will melt in view of the fact that it has a very low melting point and the sodium in the cold section may be either solid or liquid depending on its temperature and could in fact be a block of lead or other solid metal through which the cooling fluid would circulate. Sodium is preferable, because it is not only an excellent conductor of heat and electricity, but it is light in weight. As stated, a generator comprising a series of such elements would deliver a very heavy steady current due to its low ohmic resistance and operating characteristics. Its direct efficiency would not be very high, since most of the heat is carried off by the cooling fluid, but this heat is in a convenient form to be utilized again either for further electrical generation or other heating purposes, and therefore means are provided for generation of very heavy currents where efficiency is of secondary importance.

In Fig. 5 I show a modification 30 of my thermoelectric generator consisting of two spaced positive and negative elements 31 and 32 separated as previously described by a ceramic ring 33. It is preferable that the space or cavity 34 between the plates be evacuated or filled with an inert gas of low pressure. The latter is preferable, because it provides a cushion or spring against which the liquid metal 35 is forced and the recoil will expedite the return of the metal to the reservoir 36. The connecting tube 37 between the cavity and the reservoir would be short and of large cross sectional area. A piston 29 and pump 38 would be used to force the liquid metal up into the cavity. The reservoir 36 would be heated by a gas burner 39 or other conventional means to maintain the liquid metal preferably sodium in a heated stated. In operation, when the heated metal is forced up into the cavity 34, a difference of electrical potential will be developed between the outer surfaces of the dissimilar metal elements 31 and 32 which are of iron and Monel metal respectively and will continue at a diminishing rate as the elements approach the same temperature. Mercury may also be used, because it is liquid at normal temperatures and may be heated to a considerably higher temperature. As soon as the voltage has dropped to a low value, the metal can be withdrawn and heated again and the cycle repeated. In fact, it might not even be necessary to remove the metal as the cavity may be connected by a short tube 37 of large cross sectional area to a reservoir of heated liquid to which heat is continually applied, and the dissimilar metal sheets may be increased in thickness or be cooled by some other means so that continuous generation results.

In Fig. 4 I have shown this latter modification 30 of my invention utilized in conjunction with a conventional iron core 40 having a heavy primary winding 41 of one turn and a secondary winding 42 of many turns. The thermocouple 30 may then be inserted into the opening of the primary winding 41, and the liquid metal 35 may be pumped up into the cavity 34 between the metal plates 31 and 32 by the piston 29 and pump 38. As the metal is heated, a thermo-electric voltage will be generated when the metal is between the plates and interrupted when the metal is withdrawn. It can further be seen that the making and breaking of this small voltage will result in an alternating voltage much higher across the terminals of the secondary coil 42. This is analogous to the system used in automobile radios where a vibrator is used to make and break the low direct current battery voltage to produce an alternating current of relatively high voltage. Due to the low ohmic resistance, the current in the single turn 41 is very high and means have been provided for interrupting or varying a heavy current with the rise and fall of the liquid metal. This system also provides a means for converting the low voltage of a thermocouple into an alternating voltage commensurate with that of other electrical systems. It is, of course, evident that a number of such units could operate on a common iron core or on separate cores and the pulsing be timed to obtain whatever electrical frequency is desired. The sectional electrical connections may be arranged as in any other electrical system. Since this device provides means for switching a very heavy current, it could be placed at one point in the single turn coil and the remainder of the turn connected to one of the multiple element steady current generators previously described. Then the voltage would be interrupted just as for one thermocouple.

In Fig. 6 I have shown a suggested arrangement for converting heat into mechanical energy by using the pulses of electric current to alternately attract and release the armature 50. As shown in the drawing an iron core 51 has positioned around it a winding 52 consisting of one heavy turn of wire. The unit 30 shown in Figs. 4 and 5 is positioned in the opening of the winding 52 and as the molten metal is alternately pumped into and withdrawn from the cavity a pulsating electrical current will be generated which will cause the armature 50 to be attracted to the iron core 51 and which when the circuit is broken will be drawn back into position by the spring 53. The armature is shown connected to a flywheel 54 through a crank 55 and when in operation depending upon the frequency of the pulsating current the flywheel will be caused to rotate.

Although I have set forth the most satisfactory materials for the efficient operation of my thermo-electric generator, it is realized that the thermocouple elements need not be metal and that any two electrical conductors that may be heated would serve the purpose such as carbon and silicon carbide. Also that any material that becomes a fair conductor in the molten state such as salts e. g. sodium hydroxide may be used as the conducting material between the elements of the thermocouple.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. A thermo-electric generator including a casing divided into a series of chambers by spaced partitions of thermo-electric material having predetermined thermo-electric relative values, a conductive liquid in each chamber, means for heating the liquid in alternate chambers, and means for cooling the liquid in other alternate chambers.

2. A thermo-electric generator including a casing divided into a series of chambers by spaced partitions of metal alternately positive and negative, conductive liquid in each chamber, a source of heating liquid and pipe connections from said source to every other chamber to heat the liquid therein, a source of cooling liquid and pipe connections from said latter source to the intermediate chambers to cool the liquid therein.

3. In combination with an electric transformer having a core and a secondary winding thereon, a primary winding around said core and having free ends, a thermo-electric couple associated between said free ends, and means for alternately introducing to and withdrawing heated conductive liquid from between the elements of said couple.

4. In combination with an electric transformer having a core and a secondary winding thereon, a primary winding around said core and having free ends, a pair of plates forming a thermo-electric couple connected to and disposed between said free ends, and means to alternately introduce heated conductive liquid between said plates and to withdraw the heated liquid therefrom.

5. In combination with an electric transformer having a core and a secondary winding thereon, a primary winding around said core and having free ends connected to a chamber, spaced walls of said chamber formed by thermo-electric plates, a source of heated conductive liquid, connections from said source to said chamber, and means associated with said source to alternately move liquid through said connections into said chamber and withdraw it therefrom.

6. In combination with an electric transformer having a core and a secondary winding thereon, a primary winding around said core and having free ends, a thermo-electric couple associated between said free ends, and means for introducing heated conductive liquid between the elements of said couple.

HERSCHEL G. PACK.

REFERENCES CITED

The following references are of record in the file of this patent:

UNITED STATES PATENTS

| Number | Name | Date |
| --- | --- | --- |
| 375,243 | Acheson | Dec. 20, 1897 |
| 420,764 | Bradley | Feb. 4, 1890 |
| 713,652 | Kitsee | Nov. 18, 1902 |
| 2,425,647 | Sarver | Aug. 12, 1947 |

FOREIGN PATENTS

| Number | Country | Date |
| --- | --- | --- |
| 8,985 | Great Britain | of 1901 |
| 111,489 | Great Britain | June 25, 1918 |